(12) United States Patent
Kaminski

(10) Patent No.: US 7,090,031 B2
(45) Date of Patent: Aug. 15, 2006

(54) INTELLIGENT TIGHTENING SPINDLE WITH INTEGRATED MEASUREMENT TRANSDUCER, SERVO AMPLIFIER, AND DATA PROCESSING UNIT

(75) Inventor: Ulrich Kaminski, Barthloma (DE)

(73) Assignee: Cooper Power Tools GmbH & Co., Westhausen (DE)

( * ) Notice: Subject to any disclaimer, the term of this patent is extended or adjusted under 35 U.S.C. 154(b) by 0 days.

(21) Appl. No.: 10/899,949

(22) Filed: Jul. 27, 2004

(65) Prior Publication Data

US 2005/0205275 A1 Sep. 22, 2005

(30) Foreign Application Priority Data

Mar. 22, 2004 (EP) .................................. 04006867

(51) Int. Cl.
*E21B 3/00* (2006.01)
(52) U.S. Cl. ..................... 173/217; 173/176; 173/181; 173/183; 173/179; 173/2
(58) Field of Classification Search ............... 173/217, 173/176, 181, 183, 179, 2; 73/510, 511
See application file for complete search history.

(56) References Cited

U.S. PATENT DOCUMENTS

| | | | |
|---|---|---|---|
| 3,926,264 A | | 12/1975 | Bardwell et al. |
| 4,081,037 A | | 3/1978 | Jonsson |
| 4,104,779 A | * | 8/1978 | Sigmund ................. 29/407.02 |
| 4,354,233 A | * | 10/1982 | Zhukovsky et al. ........... 702/9 |
| 4,427,077 A | * | 1/1984 | Hall ........................... 173/183 |
| 4,502,549 A | | 3/1985 | Hornung et al. |
| 4,544,039 A | * | 10/1985 | Crane ......................... 173/182 |
| 5,094,301 A | * | 3/1992 | Wipperman et al. ........... 173/1 |
| 5,105,519 A | * | 4/1992 | Doniwa ................. 29/407.02 |
| 5,439,063 A | | 8/1995 | Anders et al. |
| 5,834,698 A | | 11/1998 | Izui et al. |
| 5,898,598 A | * | 4/1999 | Szwast et al. ................ 702/41 |
| 6,848,516 B1 | * | 2/2005 | Giardino ........................ 173/2 |
| 2004/0040727 A1 | * | 3/2004 | Miller ........................... 173/2 |

FOREIGN PATENT DOCUMENTS

| | | |
|---|---|---|
| EP | 0879670 | 11/1998 |
| EP | 1151821 | 11/2001 |
| WO | WO 023062 | 4/2002 |

OTHER PUBLICATIONS

Webopedia, ARCnet, 1977, www.webopedia.com.*

* cited by examiner

*Primary Examiner*—Scott A. Smith
*Assistant Examiner*—Brian Nash
(74) *Attorney, Agent, or Firm*—Coats&Bennett,P.L.L.C.

(57) ABSTRACT

An intelligent tightening spindle comprises a drive output; a housing adapted to detachably mount to a moving platform of a multi-tool processing station, with the housing substantially enclosing: at least one electric drive motor having an associated servo amplifier; a gear unit operatively connecting the drive motor to the drive output; a spindle measurement transducer operative to monitor at least one of the drive motor, the gear unit, and the drive output; and a measurement data processing unit in communication with the spindle measurement transducer. An output signal port may have signals applied thereto representing measurement data that has been processed by the measurement data processing unit. The measurement transducer and/or the data processing unit may be removably coupled to the spindle via one or more electrical connectors. One or more of the tightening spindles may be used to form a multi-tool processing station.

13 Claims, 5 Drawing Sheets

INTELLIGENT TIGHTENING SPINDLE WITH INTEGRATED MEASUREMENT TRANSDUCER, SERVO AMPLIFIER, AND DATA PROCESSING UNIT

This application claims priority from European Patent Application No. 04006867.8, filed on 22 Mar. 2004, which is incorporated herein by reference.

BACKGROUND OF THE INVENTION

The present invention generally relates to tightening spindles used for manufacturing, and particularly relates to the tightening spindles having at least one spindle measurement transducer, a servo amplifier, and a measurement data processing unit that is assigned to the spindle.

The use of various electrically powered tightening spindles to help automate production processes is well known in the art. For example, such tightening spindles are commonly employed on a assembly line for the production of motor vehicles and the like where they are used to tighten screws or nuts. Typically, such tightening spindles are monitored and controlled via appropriate spindle measurement transducers and an associated measurement data processing unit. Typically, the measurement data processing unit is in the form of a so-called screw module which is located somewhat remote from the corresponding tightening spindle and connected thereto by one or more cables. Normally, such a separate screw module is required for each spindle. With the large number of tightening spindles and screw modules, and their required interconnects, the construction and maintenance of machines that employ multiple tightening spindles is both complex and costly. Thus, there remains a need for alternative tightening spindle designs.

SUMMARY OF THE INVENTION

The present invention provides an intelligent tightening spindle that comprises a drive output; a housing adapted to detachably mount to a moving platform of a multi-tool processing station, with the housing substantially enclosing: at least one electric drive motor having an associated servo amplifier; a gear unit operatively connecting the drive motor to the drive output; a spindle measurement transducer operative to monitor at least one of the drive motor, the gear unit, and the drive output; and a measurement data processing unit in communication with the spindle measurement transducer. The housing may comprise a substantially elongate housing with the drive output at one end and the drive motor disposed toward the opposite end. The spindle may further comprise a connector interface having signals applied thereto representing measurement data that has been processed by the measurement data processing unit. The connector interface signal port may communicate with a local area network, such as via a cable, and the local area network may operate according to an ARCnet protocol. The connector interface may be used for supply voltage and for data exchange, the connector interface comprising at least an output signal port. There may be a second measurement transducer operative to monitor at least one of the drive motor, the gear unit, and the drive output. The first and second transducers may measure at least one of the parameters selected from the group consisting of rotated angle of the drive output, torque applied to the drive output, first derivative of the rotated angle with respect to time, first derivative of the applied torque with respect to time. The servo amplifier and the measurement data processing unit may be disposed beside the drive motor and the gear unit. The measurement transducer and/or the data processing unit may be removably coupled to the spindle via one or more electrical connectors.

In some embodiments, one or more of the tightening spindles may be used to form a multi-tool processing station.

DETAILED DESCRIPTION OF THE INVENTION

Figure 1:
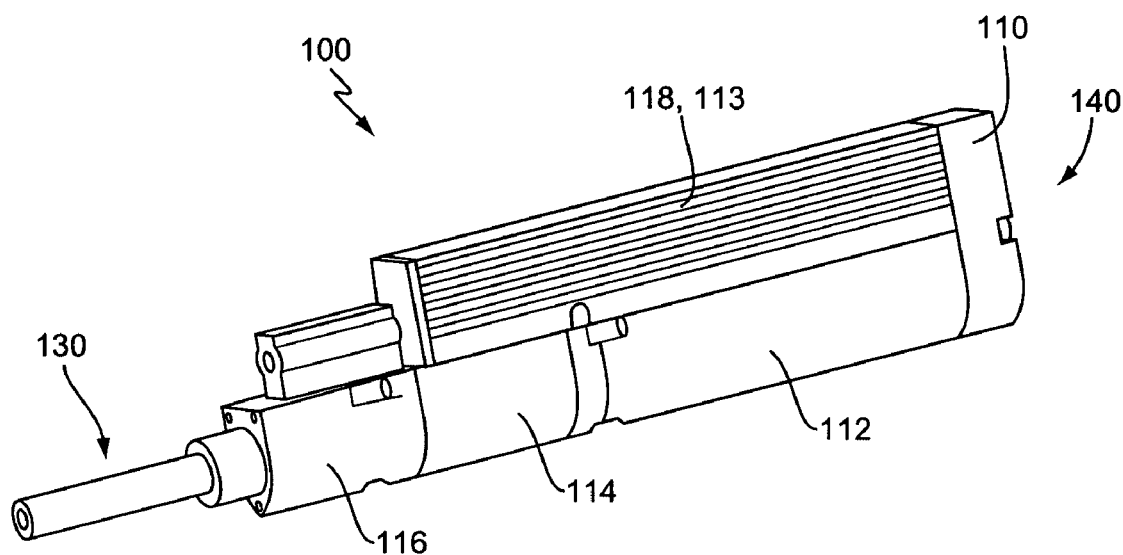
FIG. 1 shows a tightening spindle according to one embodiment of the present invention.
Figure 2:
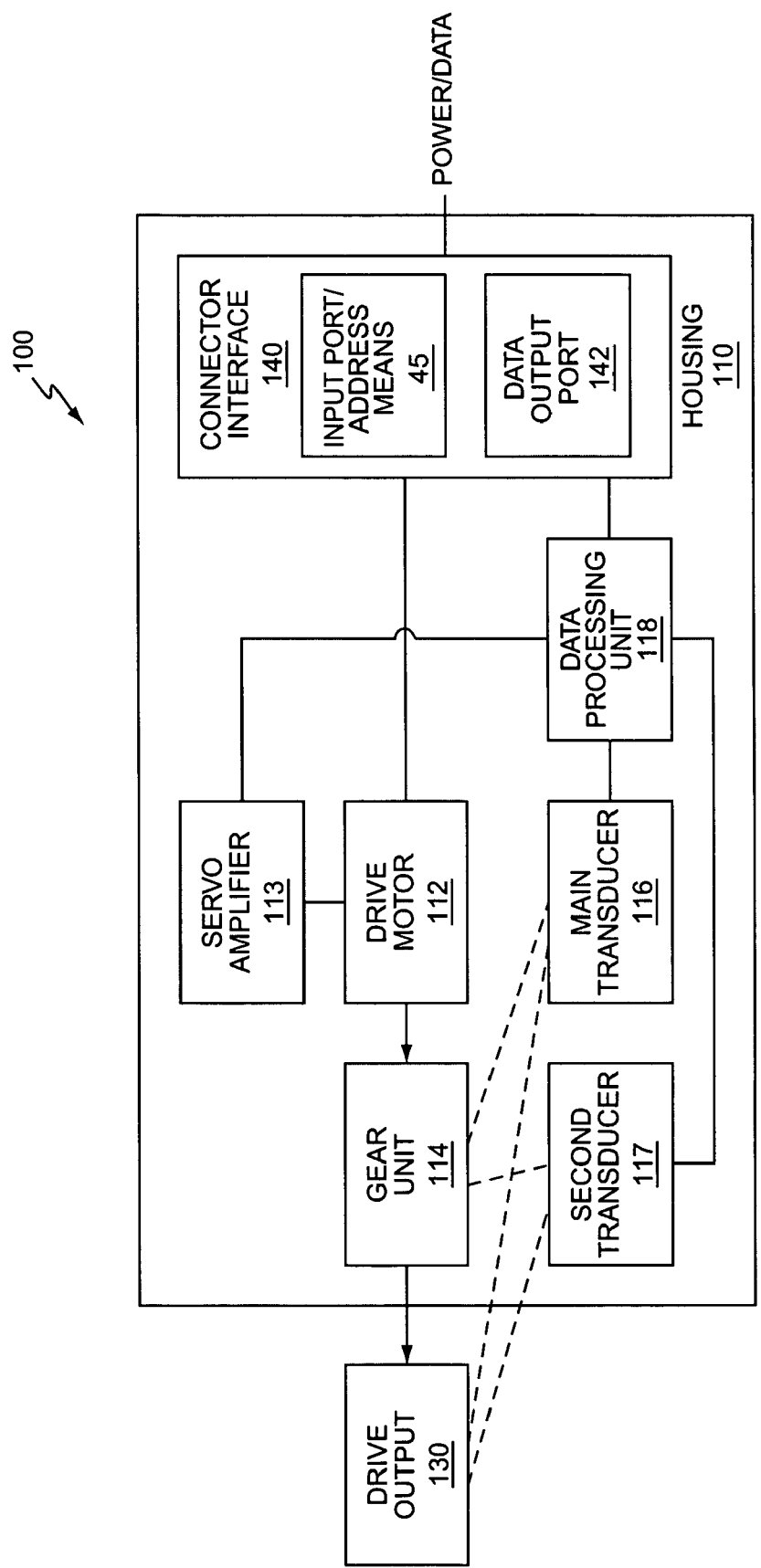
FIG. 2 shows a functional block diagram of the tightening spindle of FIG. 1.

FIG. 1 shows an exemplary embodiment of a spindle according to the present invention, generally indicated at 100. The spindle 100 includes a housing 110 and a drive output 130. The housing 110 houses the drive motor 112, a gear unit 114, a measurement transducer 116, and a measurement data processing unit 118. The drive motor 112 is electrically powered and produces rotational force in a conventional fashion. The drive motor 112 typically has a servo amplifier 113 associated therewith to aid in controlling the drive motor 112. The gear unit 114 helps couple the rotational force from the drive motor 112 to the drive output 130 in a fashion well known in the art. The drive output 130 may be straight, offset, or angled, as needed or desired.

The measurement transducer 116 is operative to monitor the drive motor 112, the gear unit 114, and/or the drive output 130. The measurement transducer 116 may be analog or digital, and may be removably connected to appropriate electronics, such as the measurement data processing unit 118, using one or more electrical connectors. The measurement transducer 116 may be configured to measure one or more parameters such as rotated angle, applied torque, or first derivatives of either of these parameters with respect to time. The spindle 100 may optionally include a second transducer 117 to provide redundancy, if desired.

The measurement data processing unit 118 receives measurement data from the measurement transducer 116 (or transducers 116,117) and processes the data and then supplies some or all of the processed data to an interface 140 with other upstream electronics, specifically an output data port 142. The measurement data processing unit 118 may advantageously be modular or otherwise removably mated to the balance of the spindle 100 via one or more suitable electrical connectors.

The spindle 100 further advantageously includes an address device 45, for example in the form of rotary switches to allow the spindle 100 to recognize signals from a central control device that are intended for that spindle 100, and vice versa. This address device 45 may form part of the interface 140.

In addition, the spindle 100 may include indicators, such as LED's or a multi-segment display (neither shown) for indicating the operational readiness of the spindle 100.

Further, the drive outputs 130 of multiple spindles 110 may be coupled a so-called group gear unit (not shown) to which a central measurement transducer (not shown) is assigned. The group gear unit may contain so-called service memory in which various characteristic data from the relevant spindles 100, gear units 114, drive outputs 130, measurement transducers 116, and the like is saved. In such an arrangement, the group gear unit and the measurement transducers 116,117 in each spindle 100 may provide redundancy.

The spindle 100 described above integrates the drive motor 112 with associated servo amplifier 113, gear unit 114, measurement transducer 116, and measurement data processing unit 118 into a common housing 110. This housing 110 thus substantially encloses the drive motor 112 with associated servo amplifier 113, gear unit 114, measurement transducer 116, and measurement data processing unit 118. The housing 110 also provides a suitable location for a connector interface 140 for the supply of power and the transfer of data. The connector interface 140 may conceptually include one or more input ports and one or more output ports. At least one of the output ports functions as the output data port 142 that receives processed data from the data processing unit 118. The housing 110 may have multiple subcomponents, such as removable lid or shell portions, but is secured together when fully assembled so as to be handled as an integrated unit. The housing 110 may advantageously be made from suitable sheet metal, plastics, or other materials known in the art.

By locating some intelligence at the spindle 100, in particular the measurement transducer 116, the data processing unit 118, and the servo amplifier 113, the spindle 100 may exchange data with a central device or station control device so that a separate and distinct control module for each spindle 100 need not be installed some distance away from each spindle 100. Thus, the number of interconnecting cables and associated equipment may be reduced.

Figure 3:
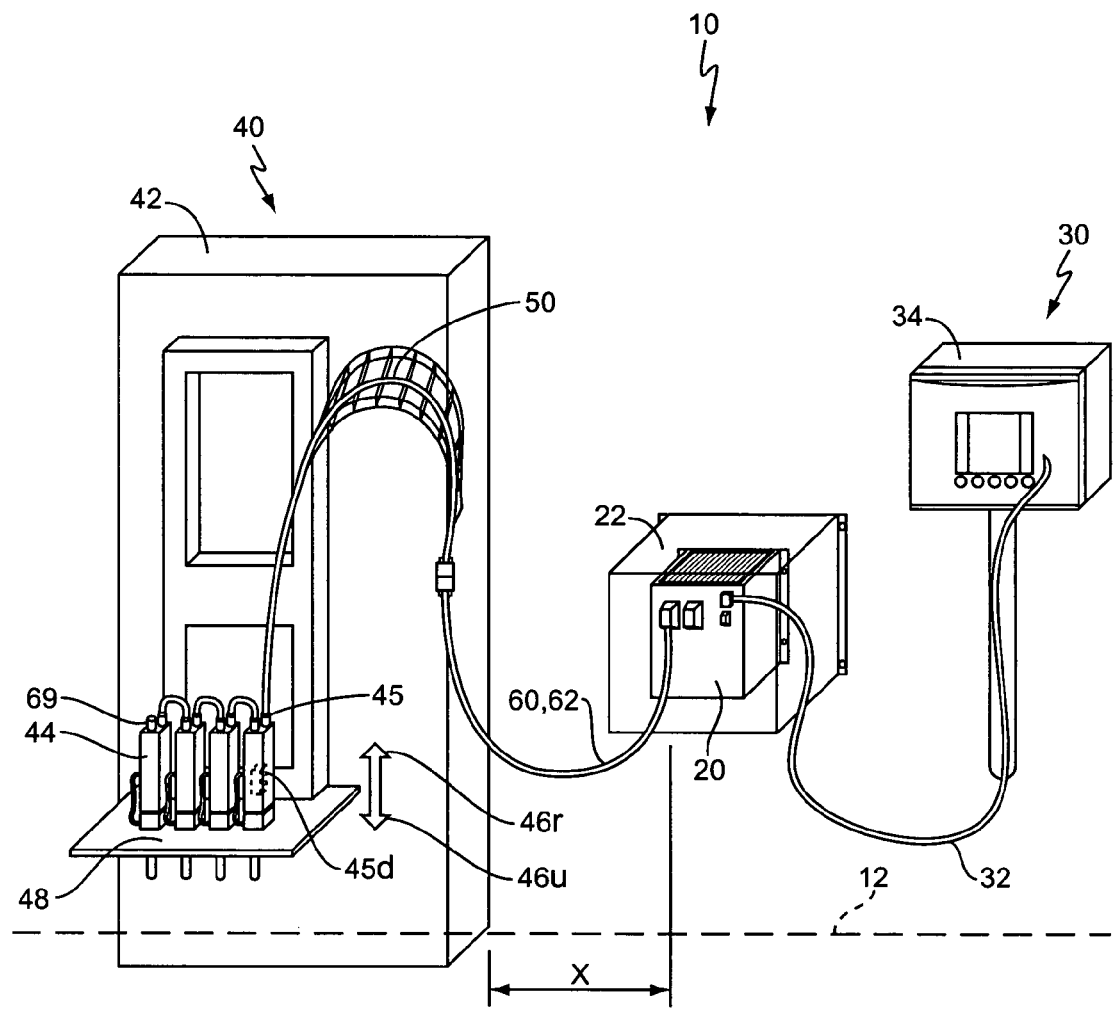
FIG. 3 shows a multi-tool process station that may use one or more tightening spindles according to the present invention.

The spindles 100 described above find particular application in a multi-tool process station that incorporates several of the described spindles 100. FIG. 3 shows an exemplary multi-tool machine, sometimes referred to herein as a multiple tool processing assembly or multi-tool process station, generally referred to at 10. The multi-tool machine 10 of FIG. 1 includes a tool sub-station 40, a voltage source 20, a controller 30, and one or more cables 32,62. For the sake of clarity, the tool sub-station 40, voltage source 20, and controller 30 are merely generally described below, with details thereof only added where necessary to aid in understanding the present invention; such devices are generally known and understood in the art. The tool sub-station 40 typically includes a cabinet 42 or other frame that supports a plurality of tools 44 for movement between an operating position 46u (e.g., down) and a storage or ready position 46r (e.g., up). Typically, the tools 44 are detachably mounted to a so-called screw plate 48, with the screw plate 48 moving vertically up and down to move the various tools 44 up and down in unison. The tools 44 are electrically powered and may take any form known in the art such as screw spindles (or more generically tightening spindles), welders, or the like. Thus, some or all of the tools 44 may be the tightening spindles 100 described above. Note that for simplicity of illustration, reference number 45 represents one or both of the measurement transducers 116,117 of tool 44 described above. The tool sub-station 40 is typically located proximate an assembly line 12, such as a vehicle assembly line.

The voltage source 20 supplies the necessary voltages to power the tools 44. The voltage source 20 may provide a single voltage, such as 24 VDC, or a plurality of voltages such as 380 VDC and 24 VDC depending on the type and number of tools 44. As is known in the art, the voltage source 20 may optionally include a braking chopper which is designed for a fixed or varying cycle time, a turn-on current limiting device, a voltage monitoring device with switch-off at prescribed minimum and/or maximum voltage values, a temperature monitoring device, heat sinks, a mains filter, a mains connection, a main switch, a main contactor, operating signal lamps, an emergency-stop device, and similar devices. The voltage source 20 may further be advantageously housed in a suitable module housing 22, and be mountable in a variety of ways, including via mounts that also function as heat sinks. As shown in FIG. 3, the voltage source 20 is spaced from the tool sub-station 40 by distance X, with this distance spanned by a cable structure 60, discussed further below.

Controller 30 controls the overall operation of the machine 10. The controller 30 is typically housed in a cabinet 34 or the like at some distance from the tool sub-station 40. The controller 30 may be located away from the voltage source 20, or co-housed therewith (see FIG. 4), as is desired. The controller 30 may connect to the voltage source 20 via a cable 32 or other means for carrying power and/or data therebetween. Further, the connection between the controller 30 and the voltage source 20 for the flow of data one or both ways may be via a wireless connection, such as an RF link, if desired.

The voltage source 20 supplies power to the tool sub-station 40 so as to enable the tools 44 to function. In the present invention, the power for a plurality of the tools 44, and optionally all the tools 44, is routed through the cable structure 60 that extends across the distance X separating the voltage source 20 and the tool sub-station 40. Typically, this cable path 60 takes the form of a single continuous cable 62, but the cable structure 60 may alternatively take the form of a plurality of cable sections connected in series. For example, the cable structure 60 may have a first portion 62 that spans the majority or totality of distance X, and a second flexible cable portion 50 detachably connected to the first portion 62 so as to be more proximate to the tools 44. It should be understood that the term "cable," as used herein, refers to a collection of one or more conductors 64 that share a common cable sheath 68 along substantially all of the relevant portions of their length, regardless of their configuration (e.g., layered, twisted, side-by-side duplex, etc.) within the common cable sheath 68. It should be noted that the conductors 64 may be of any type known in the art, such as common copper wires or optical fibers.

The cable structure 60 may advantageously extend beyond its first mechanical connection to the tool sub-station 40 so that the cable structure 60 terminates at one of the tools 44. Alternatively, the cable structure 60 may terminate at a distribution box 52 that forms part of the tool sub-station 40. In any case, the connection to the cable structure 60 may be relatively permanent, or may advantageously be made using suitable connectors that allow the cable structure 60 to be disconnected when desired, such as for purposes of repair or replacement. Indeed, all the data and power connections in the machine 10 may be made in a permanent fashion, or advantageously through appropriate detachable connections (e.g., plug connectors, etc.).

Data, such as commands and other instructions from the controller 30 are also routed through the cable structure 60. As such, the cable structure 60 may include suitably shielded conductors 66 for carrying data signals network communications, especially LAN communications, such as an ARCnet LAN. The tools 44 should include appropriate electronics to separate data from power.

As pointed out above, the cable structure 60 from the voltage source 20 may terminate at a distribution box 52 in the tool sub-station 40. With such an arrangement, the individual tools 44 may then be connected to the distribution box 52 by respective flexible cables 5*t*. Alternatively, the cable structure 60 may terminate at a first tool 44 in the tool sub-station 40, with one or more other tools 44 connecting thereto in a daisy-chain fashion. Such a daisy-chain may be open ended or close ended (e.g., a ring). It should be note that the chain may advantageously terminate in a simple termination plug 69, or in an over-voltage protection device if desired. The termination plug may be removed from one tool and added to another when adding or deleting tools 44 to the daisy-chain.

Figure 4:
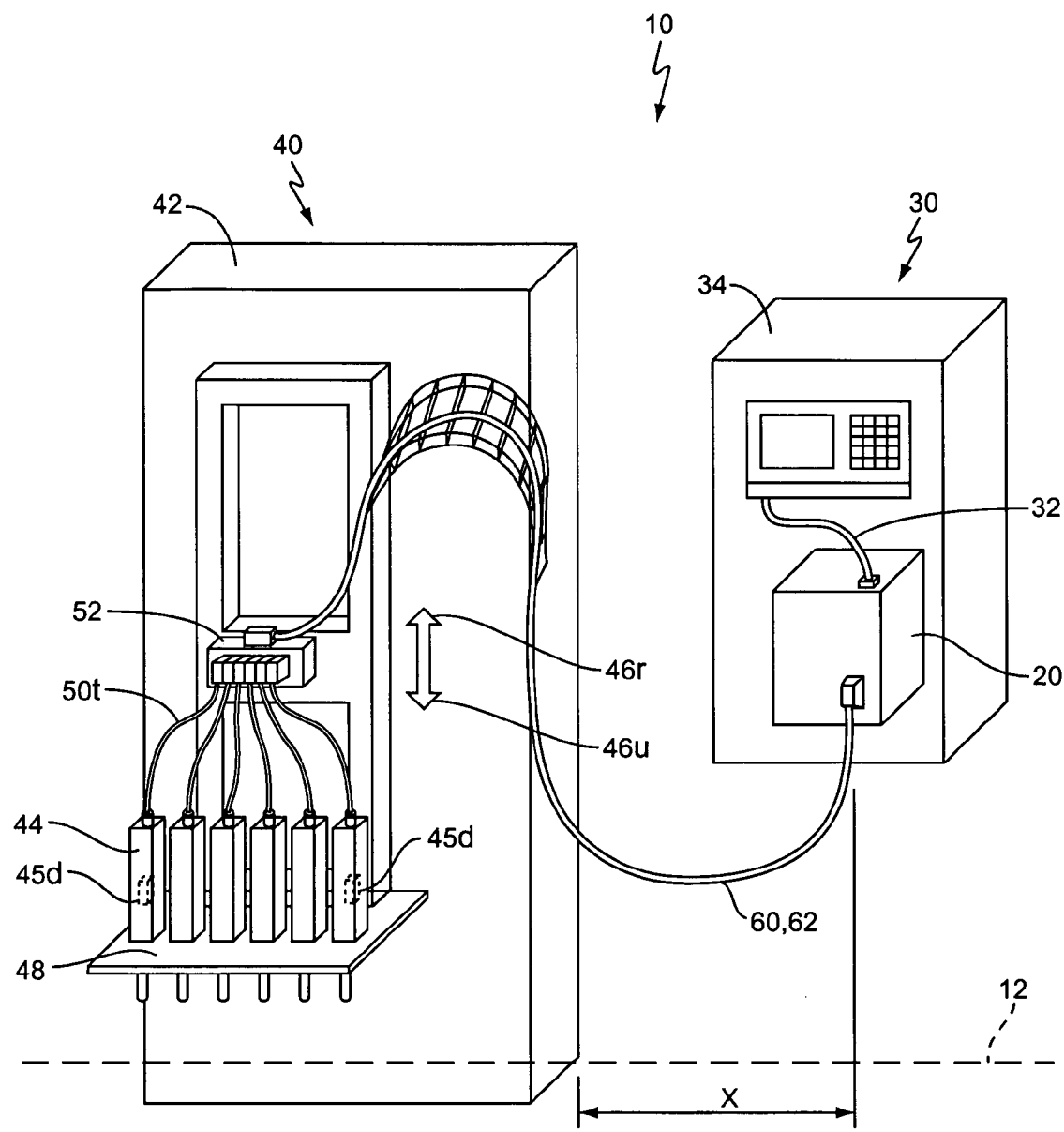
FIG. 4 shows another embodiment of a multi-tool process station that may use one or more tightening spindles according to the present invention.
Figure 5:
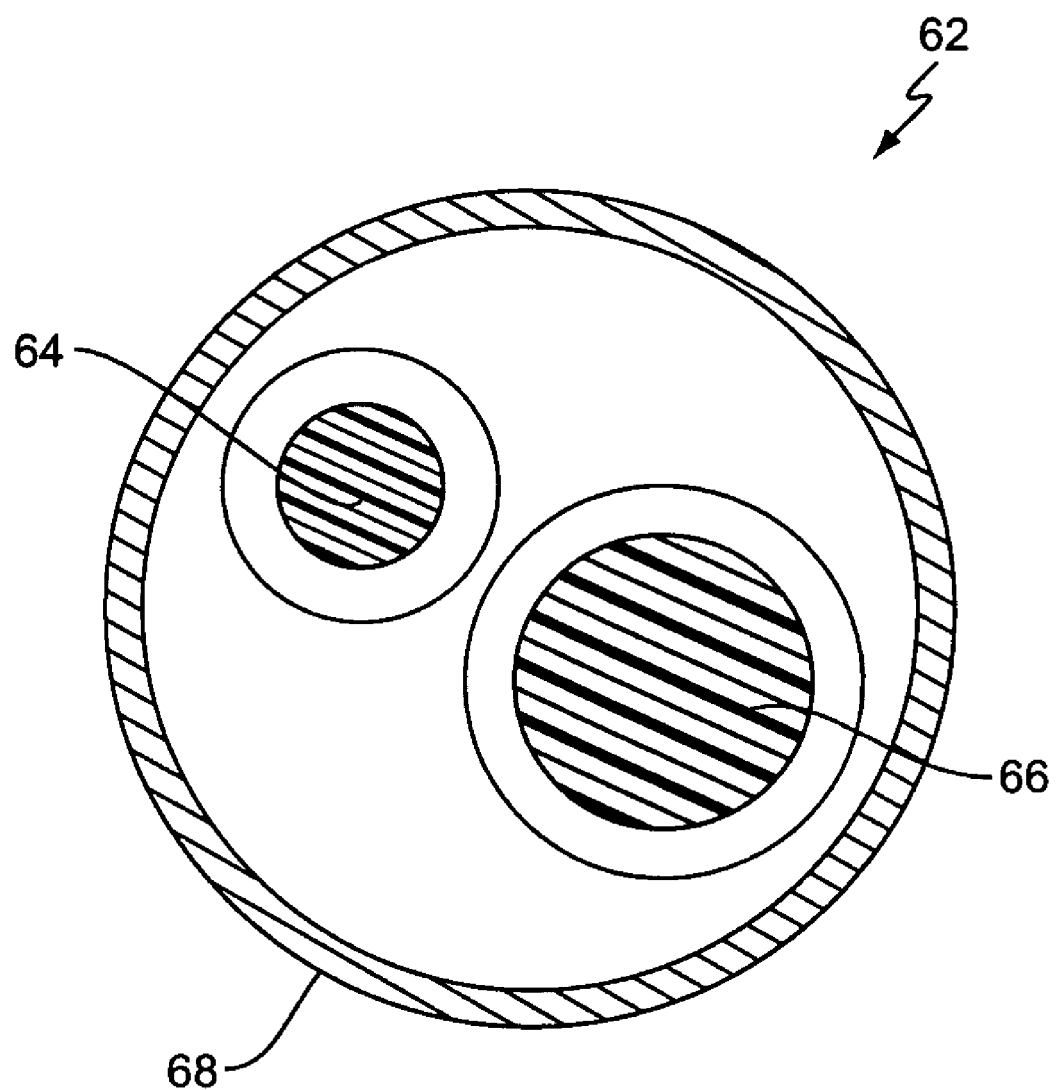
FIG. 5 shows a cross-section of a cable suitable in the cable structure shown in FIGS. 3 and 4.

By way of example, FIG. 3 shows a multi-tool machine 10 according to one embodiment of the present invention with the voltage source 20 separate from the controller 30, the cable structure 60 including a flexible cable 50, and the flexible cable 50 terminating at a tool 44, with the tools 44 connected in a daisy-chain. In the embodiment of FIG. 3, the first cable portion 62 forming the distal portion of cable structure 60 is typically installed relatively permanently, and sometimes referred to as a field cable. Such a field cable 62 will generally be less expensive than the corresponding flexible cable 50, which will generally be more expensive due to the additional flexibility and environmental requirements placed thereon. FIG. 4 shows another multi-tool machine 10 according to another embodiment of the present invention with the voltage source 20 and the controller 30 in a common cabinet, the cable structure 60 terminating at distribution box 52, and the individual tools 44 connecting to the distribution box 52 by respective flexible cables 50*t* in a fan-out arrangement. Once again, the field cable 62 forming a portion of the cable structure 60 will typically be less expensive than the multiple flexible cables 50*t* connecting the distribution box 52 to the tools 44 due to the flexibility and environmental requirements on the flexible cables 50*t*.

By supplying power and data signals to more than one tool 44 through a common cable structure 60, the costs of installing and maintaining the multi-tool machine 10 are greatly reduced. For instance, the control electronics for multiple tools 44 may be combined into a common controller 30, rather than having to have a separate controller 30 for each tool 44. Further, as the number of cables is reduced, the amount of cable breakage electronics and associated maintenance can be reduced.

In preferred embodiments, the multi-tool machine 10 will have only a single cable structure 60 extending from the voltage source 20 to the tool sub-station 40 that supplies all the power and data for all the various tools 44. As used herein, the terms "single cable structure" or "not more than one cable structure" exclude the use of multiple cables in parallel, but allow any number of cables to be used in series. In other embodiments, such as where the number of tools 44 is quite high or the power consumption of the tools 44 is high, the multi-tool machine 10 may have more than one cable structure 60 extending between the voltage source 20 and the tool sub-station 40, with at least one cable structure 60 supplying power and data to more than one tool 44.

While the discussion above has been in terms of a dedicated controller 30 and voltage source 20 for a given tool sub-station 40, the approach of the present invention may also be used where more than one tool sub-station 40 is connected to a given voltage source 20 (via separate cable structures 60), and/or where a given controller 30 controls more than one tool sub-station 40, or a combination thereof.

Additionally, those skilled in the art should recognize that, in general, the foregoing description and the accompanying illustrations represent exemplary embodiments of the present invention and should not be construed as limiting it. Indeed, the present invention is limited only by the following claims and the reasonable equivalents thereof.

What is claimed is:

1. An intelligent tightening spindle adapted to detachably mount to a moving platform of a multi-tool processing station, comprising:
   a drive output;
   a housing, said housing substantially enclosing:
      at least one electric drive motor having an associated servo amplifier;
      a gear unit operatively connecting said drive motor to said drive output;
      a spindle measurement transducer operative to monitor at least one of said drive motor, said gear unit, and said drive output;
      a measurement data processing unit in communication with said spindle measurement transducer;
   a connector interface for the connection of supply voltage and for data exchange, said connector interface comprising at least an output signal port; and
   said output signal port having signals applied thereto representing measurement data that has been processed by said measurement data processing unit.

2. The tightening spindle of claim 1 wherein said housing comprises a substantially elongate housing with said drive output at one end and said drive motor disposed toward the opposite end.

3. The tightening spindle of claim 1 wherein said output signal port communicates with a local area network.

4. The tightening spindle of claim 1 wherein said output signal port communicates with a local area network via an ARCnet cable.

5. The tightening spindle of claim 1 wherein said transducer measures at least one of the parameters selected from the group consisting of rotated angle of said drive output, torque applied to said drive output, first derivative of said rotated angle with respect to time, first derivative of said applied torque with respect to time.

6. The tightening spindle of claim 1 wherein said transducer is a first measurement transducer and further comprising a second measurement transducer substantially enclosed by said housing, said second measurement transducer operative to monitor at least one of said drive motor, said gear unit, and said drive output.

7. The tightening spindle of claim 1 wherein said servo amplifier and said measurement data processing unit are disposed beside said drive motor and said gear unit.

8. The tightening spindle of claim 1 wherein said measurement transducer is removably coupled to said measurement data processing unit via one or more electrical connectors.

9. A tightening spindle, comprising:
   a drive output,
   at least one electric drive motor having an associated servo amplifier;
   a gear unit operatively connecting said drive motor to said drive output;
   a spindle measurement transducer operative to monitor at least one of said drive motor, said gear unit, and said drive output;

a measurement data processing unit in communication with said transducer;

a housing substantially enclosing at least said drive motor and said measurement data processing unit; and a connector interface for the connection of supply voltage and for data exchange, said connector interface comprising at least an output signal port; and said output signal port having signals applied thereto representing measurement data from said transducer that has been processed by said measurement data processing unit.

10. The tightening spindle of claim 9 wherein said housing comprises a substantially elongate housing with said drive output at one end and said drive motor disposed toward the opposite end.

11. The tightening spindle of claim 9 wherein said transducer measures at least one of the parameters selected from the group consisting of rotated angle of said drive output, torque applied to said drive output, first derivative of said rotated angle with respect to time, first derivative of said applied torque with respect to time.

12. The tightening spindle of claim 9 wherein said transducer is a first measurement transducer and further comprising a second measurement transducer substantially enclosed by said housing, said second measurement transducer operative to monitor at least one of said drive motor, said gear unit, and said drive output.

13. The tightening spindle of claim 9 wherein said servo amplifier and said measurement data processing unit are disposed beside said drive motor and said gear unit.

* * * * *